July 19, 1927. 1,636,047

E. R. DAVIS

CALF WEANER

Filed May 28. 1925

Inventor
E.R.Davis,

By

Attorney

Patented July 19, 1927.

1,636,047

UNITED STATES PATENT OFFICE.

ELISHA R. DAVIS, OF HAZARD, NEBRASKA.

CALF WEANER.

Application filed May 28, 1925. Serial No. 33,531.

This invention relates to calf weaners.

One object is to provide a device in the form of a muzzle or guard which may be readily applied to the head of the animal to effectively accomplish weaning and permit the animal to get its mouth to the ground to nibble the grass.

Another object of the invention resides in the provision of a simple, inexpensive durable and efficient weaning device which may be easily and readily applied or removed and comfortably worn by the animal for weaning purposes and yet not otherwise interfere with the animal's grazing or eating from the ground.

With the above and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

Figure 1:
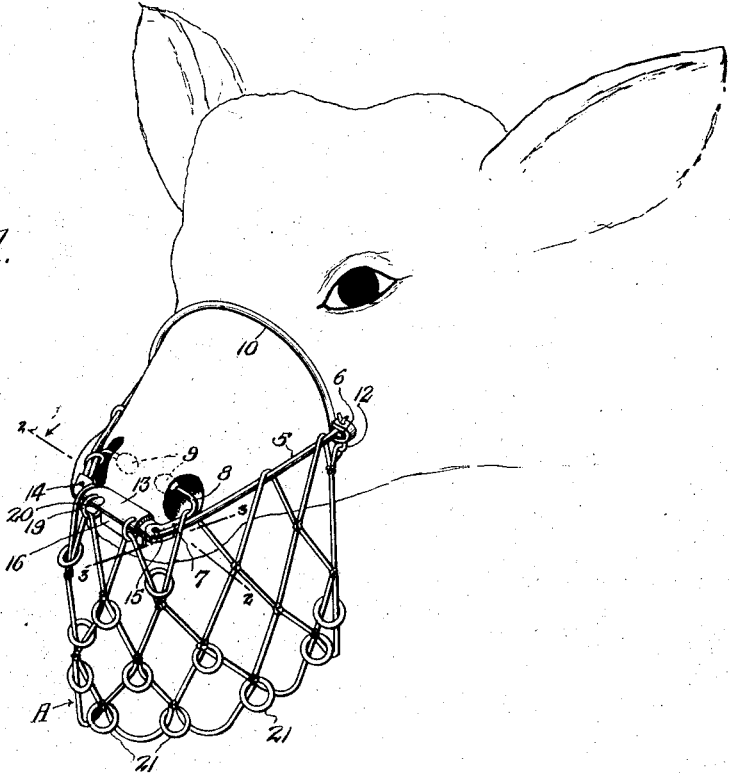
Fig. 1 is a perspective view of the weaner applied to the head of the animal, a part being broken away.
Figure 2:
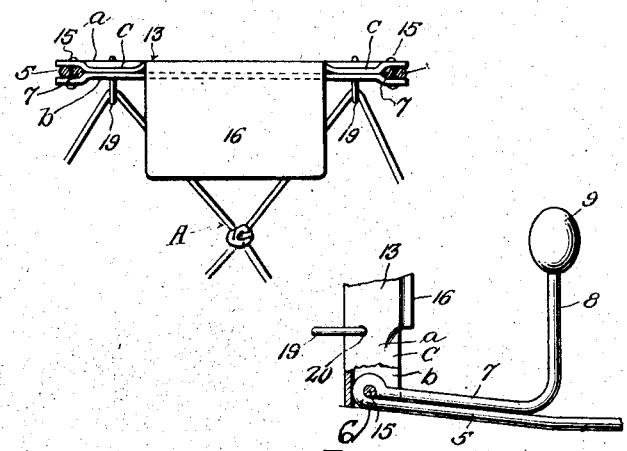
Fig. 2 is a sectional view on the line 2—2 of Fig. 1, looking in the direction of the arrow.
Figure 3:
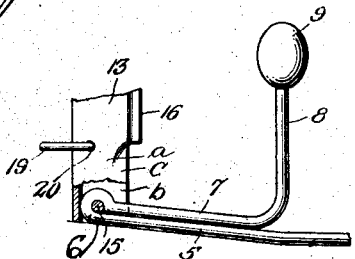
Fig. 3 is a sectional view on the line 3—3 of Fig. 1.
Figure 4:
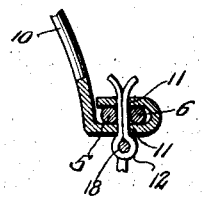
Fig. 4 is a detail view of the connection between the nose-engaging member and one of the side bars.

Referring now more particularly to the accompanying drawings, the reference character 5 indicates side bars of metal or any other suitable material, adapted to extend along the sides of the mouth or head of the animal and each at its inner end having an eye 6 and at its outer end turned back upon itself, as at 7, with the turned back ends 7 having their inner ends directed laterally toward each other as at 8, and enlarged or provided with spherical shaped nostril engaging knobs 9.

A nose-engaging member 10 connects the inner ends of the side bars, the ends of the member 10 being turned back upon the same to overlap or embrace the side bars at the eyes 6 and having apertures 11 adapted to register with the respective eyes 6 to receive the cotter pins or other suitable removable fastenings 12.

A plate 13 connects the outer ends of the side bars. This plate is composed preferably of sheet metal bent upon itself to form upper and lower sections $a$ and $b$, respectively, and at their ends envelop and enclose the outer ends of the side bars and turned back portions 7. Perforations 14 at the ends of the plate 13 register with the respective eyes 6' of the side bars to receive the pivots 15, so that by removal of one of the fastenings 12 to release the nose engaging member 10 from connection with the respective side bar, the pivotal connections 15 will permit of such movement between the side bars and plate 13 as to separate or throw the nostril engaging knobs 9 out of alinement to permit placing the knobs in the nostrils of the animal, when the nose engaging member 10 may be again connected to the respective side bar to lock the device in the animal's nostrils.

The upper section $a$ of the connection plate 13 has a depending projection 16 which extends downwardly below the lower section $b$ to form a guard to lie against the upper lip of the animal to restrain the muzzle from tipping when the animal has its head down eating from the ground.

The inner edges of the upper and lower sections $a$ and $b$ may be pinched or compressed together between the guard 16 and the side bars, as indicated at $c$.

There is thus provided a suitable frame for the muzzle and the latter is indicated generally, by the reference letter A and is composed of flexible waterproof fabric, such for instance, as rubberized cord or strips, interlaced to provide a flexible muzzle. The muzzle may be suspended from the frame in any suitable manner but, as shown, the upper loops of the mesh material are disposed over the side bars 5 and with the uppermost rear loop on each side suspended from the respective eye 18 of the respective fastening 12, as shown. At the front of the frame the top loops may be looped over the plate 13 between the projection 16 and the side bars where the plate sections $a$ and $b$ are compressed together, and if desired, rings 19 may be connected through eyes 20, to the plate 13, and through which rings 19 upper loops of the mesh material may be looped, as shown.

Wire rings or the like 21 are preferably interlaced with the loops of the muzzle fabric at the front of the muzzle and along the entire lower edge of the muzzle to protect the waterproof material against attack by the animal, that is, to prevent the animal from chewing the waterproof mesh or fabric material of which the muzzle is formed.

From the foregoing it will be seen that I provide a weaning muzzle which may be readily applied and locked and as readily removed from the animal and that the muzzle material is such as to not injure either the calf or its mother in attempts to feed from the mother and yet permit the calf to eat from the ground.

What is claimed is:

1. A device of the character described comprising side bars, a nose-engaging member connected to the inner ends of the side bars, the outer ends of the side bars being turned back upon themselves and directed inwardly terminating in nostril engaging knobs, a plate embracing the outer ends of the side bars and portions of the said turned back portions, wire rings secured to said plate, and waterproof mesh material suspended from the side bars, and from the rings of said plate and the connection between the side bars and nose-engaging member.

2. A device of the character described comprising side bars, a nose-engaging member connected to the inner ends of the side bars, the outer ends of the side bars being turned back upon themselves and directed inwardly terminating in nostril engaging knobs, a plate embracing the outer ends of the side bars and portions of the said turned back portions, wire rings secured to said plate, waterproof fibrous mesh material suspended from the side bars, and from the rings of said plate and the connection between the side bars and nose-engaging member, and wire rings interlaced with the mesh material at the front and along the side edges to prevent the animal chewing the waterproof mesh material.

3. A device of the character described comprising side bars, a nose-engaging member connected to the inner ends of the side bars, the outer ends of the side bars being turned back upon themselves and directed inwardly terminating in nostril engaging knobs, a plate embracing the outer ends of the side bars and portions of the said turned back portions, wire rings secured to said plate, waterproof mesh material suspended from the side bars, and from the rings of said plate and the connection between the side bars and the nose engaging member, said plate having a projection to engage the upper lip of the animal to prevent forward tipping of the device when the animal eats from the ground.

4. A device of the character described comprising side bars, a nose-engaging member connected to the inner ends of the side bars, the outer ends of the side bars being turned back upon themselves and directed inwardly terminating in nostril engaging knobs, a plate embracing the outer ends of the side bars and portions of the said turned back portions, wire rings secured to said plate, waterproof mesh material suspended from the side bars, and from said plate and said bars and the connection between the side bars and nose-engaging member, wire rings interlaced with the mesh material at the front and along the side edges to prevent the animal chewing the waterproof mesh material, said plate having a depending projection to engage the upper lip of the animal to prevent tilting of the device when the animal is eating from the ground.

5. A device of the character described comprising side bars, a nose engaging member, means for locking the ends of the nose engaging member to the side bars, nostril engaging knobs carried by the side bars, a plate pivotally connecting the outer ends of the side bars whereby upon releasing a locked end of the nose-engaging member the side bars may be shifted to separate the nostril engaging knobs to permit application of the knobs to the animal's nostrils or to remove the knobs therefrom, the plate having a projection to lie against the animal's upper lip to prevent tilting of the device, and a muzzle suspended from the side bars and plate.

6. A device of the character described comprising side bars, a nose engaging member, means for locking the ends of the nose engaging member to the side bars, nostril engaging knobs carried by the side bars, a plate pivotally connecting the outer ends of the side bars whereby upon releasing a locked end of the nose-engaging member the side bars may be shifted to separate the nostril engaging knobs to permit application of the knobs to the animal's nostrils or to remove the knobs therefrom, and a muzzle suspended from the side bars and plate.

7. A device of the character described comprising side bars, nostril engaging knobs carried by the side bars, a plate pivotally connecting the outer ends of the bars, an element releasably connecting the inner ends of the bars whereby upon release of the connection at the inner ends of the bars the bars may be shifted to separate the nostril engaging knobs to permit application of the knobs to the animal's nostrils or to remove the knobs therefrom, said plate having a projection to lie against the animal's lip, and a muzzle suspended from the bars and plate.

In testimony whereof I have hereunto set my hand.

ELISHA R. DAVIS.